United States Patent
Komatsu et al.

(10) Patent No.: US 7,107,377 B2
(45) Date of Patent: Sep. 12, 2006

(54) INFORMATION PROCESSING APPARATUS AND METHOD OF CONTROLLING AN ACCESS LEVEL

(75) Inventors: Shimpei Komatsu, Kawasaki (JP); Yusuke Kawasaki, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 407 days.

(21) Appl. No.: 10/095,091

(22) Filed: Mar. 12, 2002

(65) Prior Publication Data
US 2002/0174278 A1 Nov. 21, 2002

(30) Foreign Application Priority Data
May 15, 2001 (JP) .............................. 2001-145176

(51) Int. Cl.
G06F 12/00 (2006.01)
G06F 12/14 (2006.01)
G06F 13/28 (2006.01)

(52) U.S. Cl. .................. 710/200; 711/163; 726/27

(58) Field of Classification Search ............ 710/200, 710/220, 107; 711/163; 713/200; 726/2, 726/27
See application file for complete search history.

(56) References Cited

U.S. PATENT DOCUMENTS

| | | | |
|---|---|---|---|
| 4,766,537 A | * | 8/1988 | Zolnowsky ............... 711/163 |
| 5,305,460 A | * | 4/1994 | Kaneko et al. ........... 711/163 |
| 5,390,310 A | * | 2/1995 | Welland .................. 711/203 |
| 5,845,129 A | * | 12/1998 | Wendorf et al. .......... 710/200 |

FOREIGN PATENT DOCUMENTS

| | | | |
|---|---|---|---|
| EP | 0 472 487 | * | 2/1992 |
| EP | 0 472 487 A2 | | 2/1992 |
| EP | 0 735 488 | * | 10/1996 |
| EP | 0 735 488 A1 | | 10/1996 |
| FR | 2 661 532 | * | 10/1991 |
| JP | 4-124733 | * | 4/1992 |
| JP | 5-81044 | * | 4/1993 |

OTHER PUBLICATIONS

Bovet, D.P., et al., "Understanding the LINUX Kernel", Jan. 30, 2001, XP-002243165, pp. 53-87.*
Anonymous: "Memory Protection for I/O Devices", IBM Technical Disclosure Bulletin, vol. 29, No. 1, Jun. 1, 1986. pp. 35-36.*

* cited by examiner

Primary Examiner—Mark H. Rinehart
Assistant Examiner—Thomas J Cleary
(74) Attorney, Agent, or Firm—Staas & Halsey LLP

(57) ABSTRACT

An information processing apparatus includes a process part implementing an access to a designated address having an access level, an access detector detecting the access, and an access part being capable of changing the access level of the designated address when the access is detected by the access detector.

14 Claims, 10 Drawing Sheets

FIG.4

| ADDRESS | DATA | |
|---|---|---|
| add11 | pRA11 | LEVEL CHANGE ROUTINE RA |
| : | : | |
| add1a | pRA1a | |
| add21 | pRB11 | LEVEL CHANGE ROUTINE RB |
| : | : | |
| add2b | pRB1b | |
| add31 | ppa11 | LEVEL CHANGE ROUTINE PA |
| : | : | |
| add3c | ppa1c | |
| add41 | ds11 | SYSTEM DATA Ds |
| : | : | |
| add4d | ds1d | |

| RA | RB | PA | Ds |

| | LEVEL | | |
|---|---|---|---|
| 1 | 2 | 3 | |
| ○ | ○ | ○ | |
| ○ | ○ | ○ | |
| × | × | × | |
| × | × | × | |

(B)

| Pt1 | Pt2 | Pt3 | DATA |

| | LEVEL | | |
|---|---|---|---|
| 1 | 2 | 3 | |
| ○ | × | × | |
| × | ○ | × | |
| × | × | ○ | |
| ○ | ○ | ○ | |

(C)

| Dt1 | Dt2 | Dt3 | WORK AREA |

| | LEVEL | | |
|---|---|---|---|
| 1 | 2 | 3 | |
| ○ | × | × | |
| × | ○ | × | |
| × | × | ○ | |
| ○ | ○ | ○ | |

INFORMATION PROCESSING APPARATUS AND METHOD OF CONTROLLING AN ACCESS LEVEL

BACKGROUND OF THE INVENTION

1. Field of the Invention

The present invention generally relates to information processing apparatuses and methods of controlling an access level, and more particularly, to an information processing apparatus and a method of controlling an access level by which it is possible to change an access level in every process.

2. Description of the Related Art

An access allowance area including a device is set for every execution unit of a program such as a task, in a system including a central processing unit (CPU). It is controlled to set the access allowance at a level that is provided for every task. Plural tasks are executed by a manager administrative program. The manager administrative program has a privileged level in which it is allowed to access all areas, in order to manage respective tasks. The CPU makes the manager administrative program execute a change of the task based on an interrupt caused by hardware or software.

According to a related art information processing apparatus, it executes to change a level of the task to the level of the manager administrative program by detecting the interrupt.

However, according to the related art information processing apparatus, if a process to prohibit interrupting to the CPU is implemented, for example, it may be possible to execute the task at the privileged level. Hence, the related art information processing apparatus may have a problem in that it may be possible to alter a program of another task or read out highly secret data such as an encryption key.

SUMMARY OF THE INVENTION

Accordingly, it is a general object of the present invention to provide a novel and useful information processing apparatus and method of controlling an access level, the information apparatus having a high security level, in which one or more of the problems described above are eliminated.

Another and more specific object of the present invention is to provide an information processing apparatus, including a process part implementing an access to a designated address having an access level, an access detector detecting the access, and an access part being capable of changing the access level of the designated address when the access is detected by the access detector.

The above objects of the present invention are also achieved by a method of controlling an access level of a designated address accessed by a process part of an information processing apparatus, including a) detecting the access by the process part to the designated address, and b) being capable of changing the access level of the designated address when the access is detected.

According to the above invention, it is possible to limit the ability to change the access level of tasks other than a privileged task. It is possible to avoid generating a bug in each of tasks or to prevent a memory from being destroyed intentionally or information from leaking out by limiting the ability to change the access level. As a result, it is possible to realize a high security level of the information processing apparatus.

For example, the access part may include a level holding part outputting an access level which is pre-set at the designated address when the access to the designated address is detected by the access detector, an access allowance setting part in which an access allowance address for every access level is set, an access control part selecting the access allowance address which is set at the access allowance setting part and which corresponds to the access level output from the level holding part, and thereby the access by the process part is allowed when the designated address accessed by the process part agrees with the access allowance address. The access control part may include a select part selecting the access allowance address corresponding to the access level, a comparison part comparing the access allowance address selected by the select part and the designated address, and a control part allowing the process part to access the designated address when the designated address agrees with the access allowance address. The access detector may include a first comparator detecting whether the address accessed by the process part agrees or disagrees with an address whose access level is changed, a second comparator detecting whether or not an access control signal output from the process part indicates an instruction fetch, and a determination part determining that the first comparator detects the address accessed by the process part agrees with the address whose access level is changed and the second comparator detects the access control signal indicating the instruction fetch.

In addition, the access level of the designated address may be changed when an instruction fetch is detected. The access level of the designated address may be changed when the address accessed by the process part agrees with an address whose access level is changed. The access to the designated address may be implemented when the designated address agrees with a pre-set access allowance address.

Other objects, features, and advantages of the present invention will be come more apparent from the following detailed description when read in conjunction with the accompanying drawings.

BRIEF DESCRIPTION OF THE DRAWINGS

FIG. 4 is a data structure chart of an internal ROM of the embodiment according to the present invention;

FIG. 5 is a chart for explaining an access level of the embodiment according to the present invention;

DETAILED DESCRIPTION OF THE PREFERED EMBODIMENTS

A description will now be given, with reference to the drawings, of embodiments of the present invention.

Figure 1:
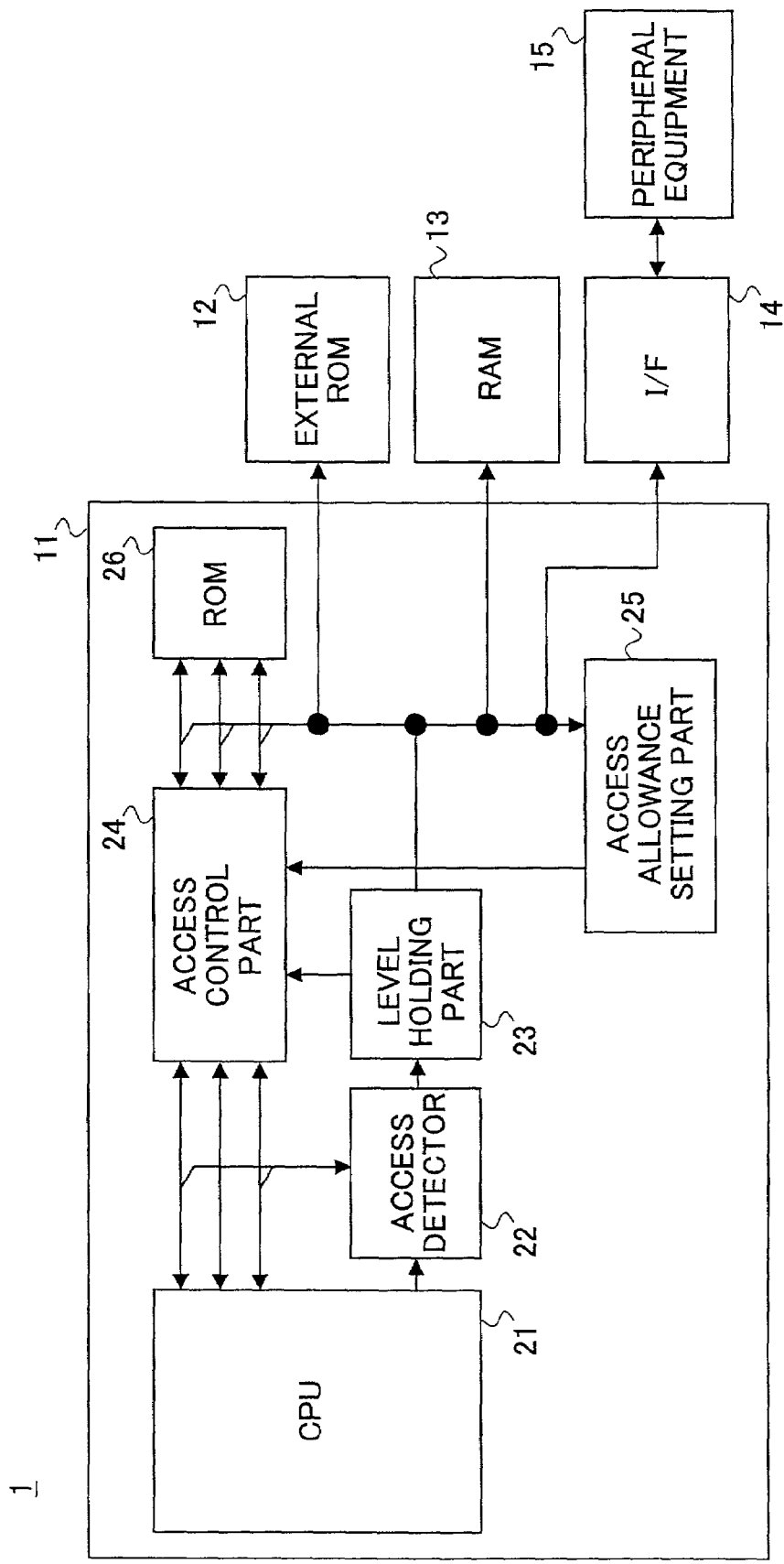
FIG. 1 is a block diagram of an embodiment according to the present invention.

FIG. 1 is a block diagram of an embodiment according to the present invention.

Referring to FIG. 1, an information processing system 1 includes an information processing apparatus 11, an external ROM 12, a RAM 13, an interface part 14, and peripheral equipment 15.

The information processing apparatus 11 exchanges a program and data with the external ROM 12, the RAM 13, and with the peripheral equipment 15 through the interface part 14. The information processing apparatus 11 executes data processing based on the program. The program executed by the information processing apparatus 11 and fixed data used for the program are stored in the external ROM 12.

Figure 2:
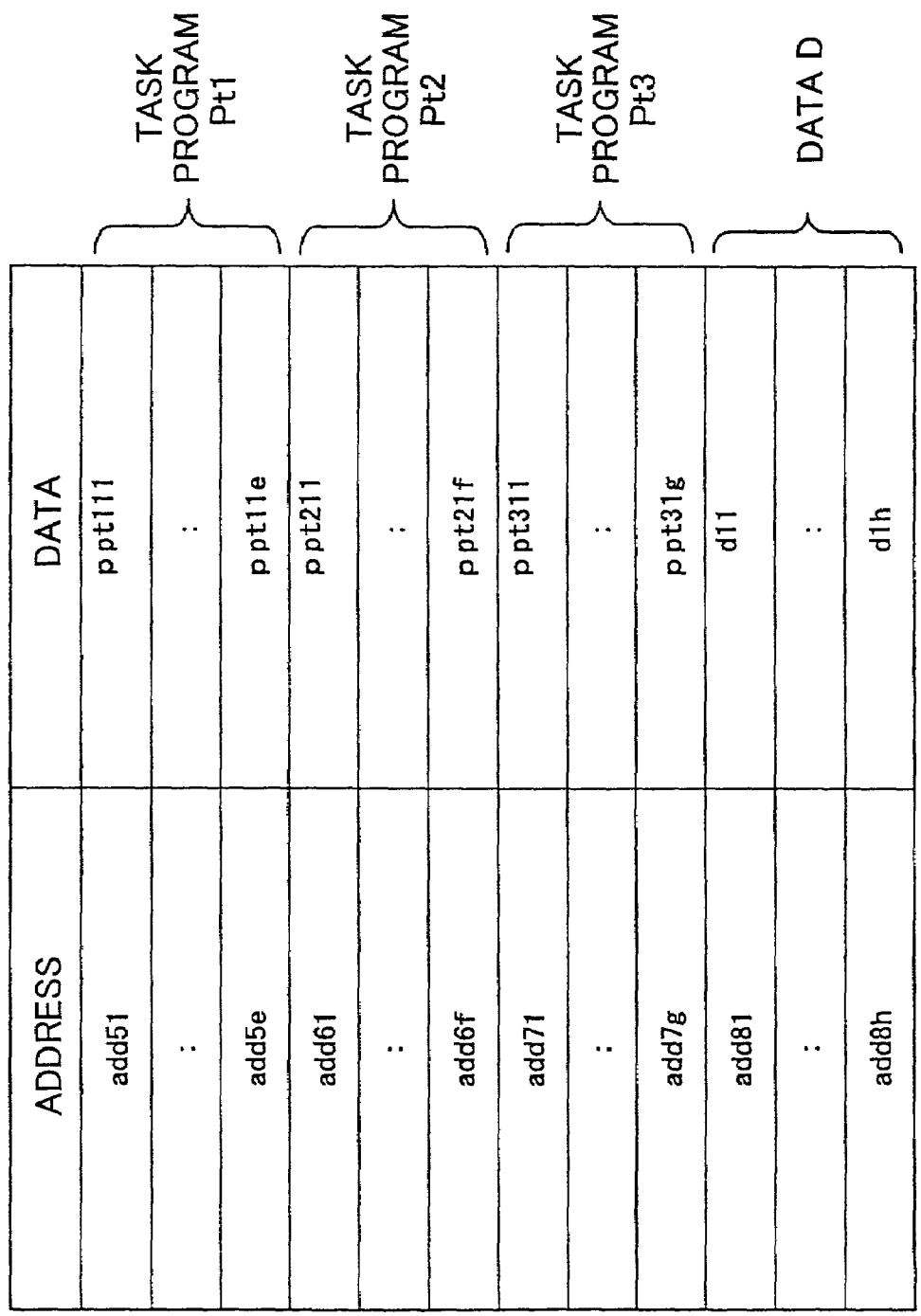
FIG. 2 is a data structure chart of an external read-only memory (ROM) of the embodiment according to the present invention.

FIG. 2 is a data structure chart of the external ROM 12 of the embodiment according to the present invention.

Referring to FIG. 2, each of instructions (data) ppt1l1 through ppt1le, of which a task program Pt1 is comprised, is stored in a respective address add51 through add5e of the external ROM 12. Each of instructions ppt211 through ppt21f, of which a task program Pt2 is comprised, is stored in a respective address add61 through add6f of the external ROM 12. Each of instructions ppt311 through ppt31g, of which a task program Pt3 is comprised, is stored in a respective address add71 through add7g of the external ROM 12. Each of data d11 through d1h, of which the fixed data D is comprised, is stored in a respective address add81 through add8h of the external ROM 12. The task programs Pt1 through Pt3 and the data D are read out by an access from the CPU 21 and supplied to the CPU 21.

The RAM 13 is used as a storage area for jobs of a process by the information processing apparatus 11.

Figure 3:
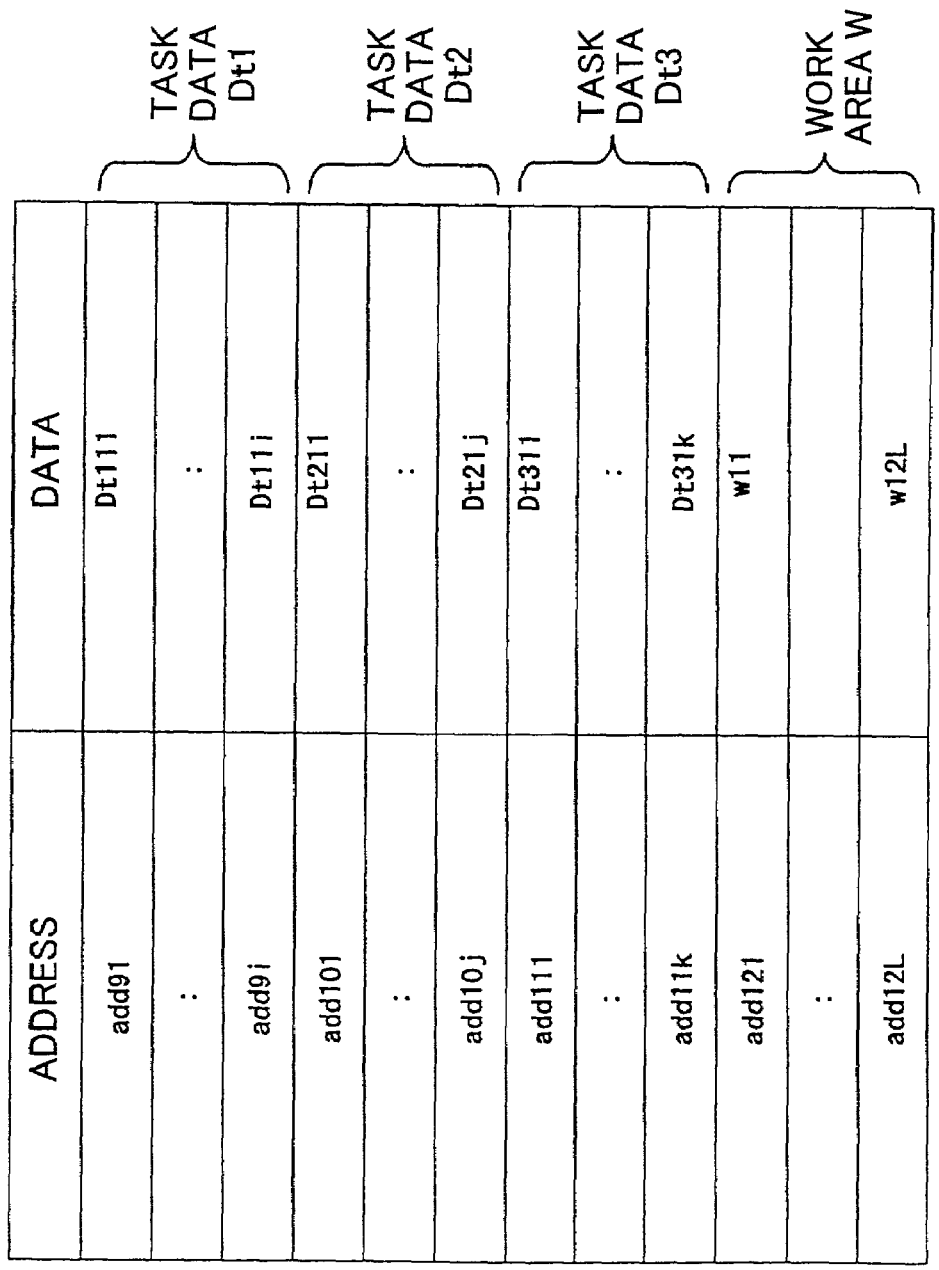
FIG. 3 is a data structure chart of a random access memory (RAM) of the embodiment according to the present invention.

FIG. 3 is a data structure chart of the RAM 13 of the embodiment according to the present invention.

Referring to FIG. 3, each of data Dt111 through Dt11i, of which task data Dt1 are comprised and which is used in the task program Pt1, is stored in a respective address add91 through add9i of the RAM 13. Each of data Dt211 through Dt21j, of which task data Dt2 are comprised and which is used in the task program Pt2, is stored in a respective address add101 through add10j of the RAM 13. Each of data Dt311 through Dt31k, of which task data Dt3 are comprised and which is used in the task program Pt3, is stored in a respective address add111 through add11k of the RAM 13. Each of addresses add121 through add12l is used as a work area W.

The interface part 14 exchanges data between the information processing apparatus 11 and the peripheral equipment 15.

The information processing apparatus 11 is, for example, comprised of one chip of a large scale integration circuit (LSI). The information processing apparatus 11 includes the CPU 21, an access detector 22, a level holding part 23, an access control part 24, an access allowance setting part 25, and an internal ROM 26.

The CPU 21 executes an operation process. The CPU 21 can access and exchange data with the internal ROM 26, the external ROM 12, the RAM 13 and the peripheral equipment 15, through the access control part 24. In addition, the CPU 21 manages the manager administrative program stored in the internal ROM 26 and a change of an access level by level change routines RA and RB.

FIG. 4 is a data structure chart of the internal ROM 26 of the embodiment according to the present invention.

Referring to FIG. 4, each of instructions pRA11 through pRA1a, of which the level change routine RA is comprised, is stored in a respective address add11 through add1a of the internal ROM 26. Each of instructions pRB11 through pRB1b, of which the level change routine RB is comprised, is stored in a respective address add21 through add2b of the internal ROM 26. Each of instructions ppa11 through ppa1c, of which a manager administrative program PA is comprised, is stored in a respective address add31 through add3c of the internal ROM 26. Each of data ds11 through ds1d, of which a system data Ds is comprised, is stored in a respective address add41 through add4d of the internal ROM 26. The level change routines RA and RB and the system data Ds are read out by an access requirement of the CPU 21 and supplied to the CPU 21.

Here, the access level will be described.

The access level is information for determining an area where an access from the CPU 21 to the external ROM 12, the RAM 13, the peripheral equipment 15, and the internal ROM 26 is allowed. The access level is comprised of four levels of L0 through L3.

FIG. 5 is a chart for explaining an access level of the embodiment according to the present invention. FIG. 5-(A) is a chart for explaining an access level with regard to an access to the internal ROM 26. FIG. 5-(B) is a chart for explaining an access level with regard to an access to the external ROM 12. FIG. 5-(C) is a chart for explaining an access level with regard to an access to the RAM 13.

The level L0 is an access level where an access to all addresses is allowed.

Referring to FIG. 5, the level L1 is an access level where an access to the task program Pt1 and the task data Dt1 used in the task program Pt1 is allowed. The level L2 is an access level where an access to the task program Pt2 and the task data Dt2 used in the task program Pt2 is allowed. The level L3 is an access level where an access to the task program Pt3 and the task data Dt3 used in the task program Pt3 is allowed. The access level can be changed for every process of the CPU 21.

When the access level is changed from a lower access level to an upper access level, for example from the access level L1 through L3 to the access level L0, the level change routine RA is executed by the CPU 21. When the access level is changed from the upper access level to the lower access level, for example from the access level L0 to the access level L1 through L3, the level change routine RB is executed by the CPU 21.

Here, the access detector 22 will be described with reference to FIG. 6.

Figure 6:
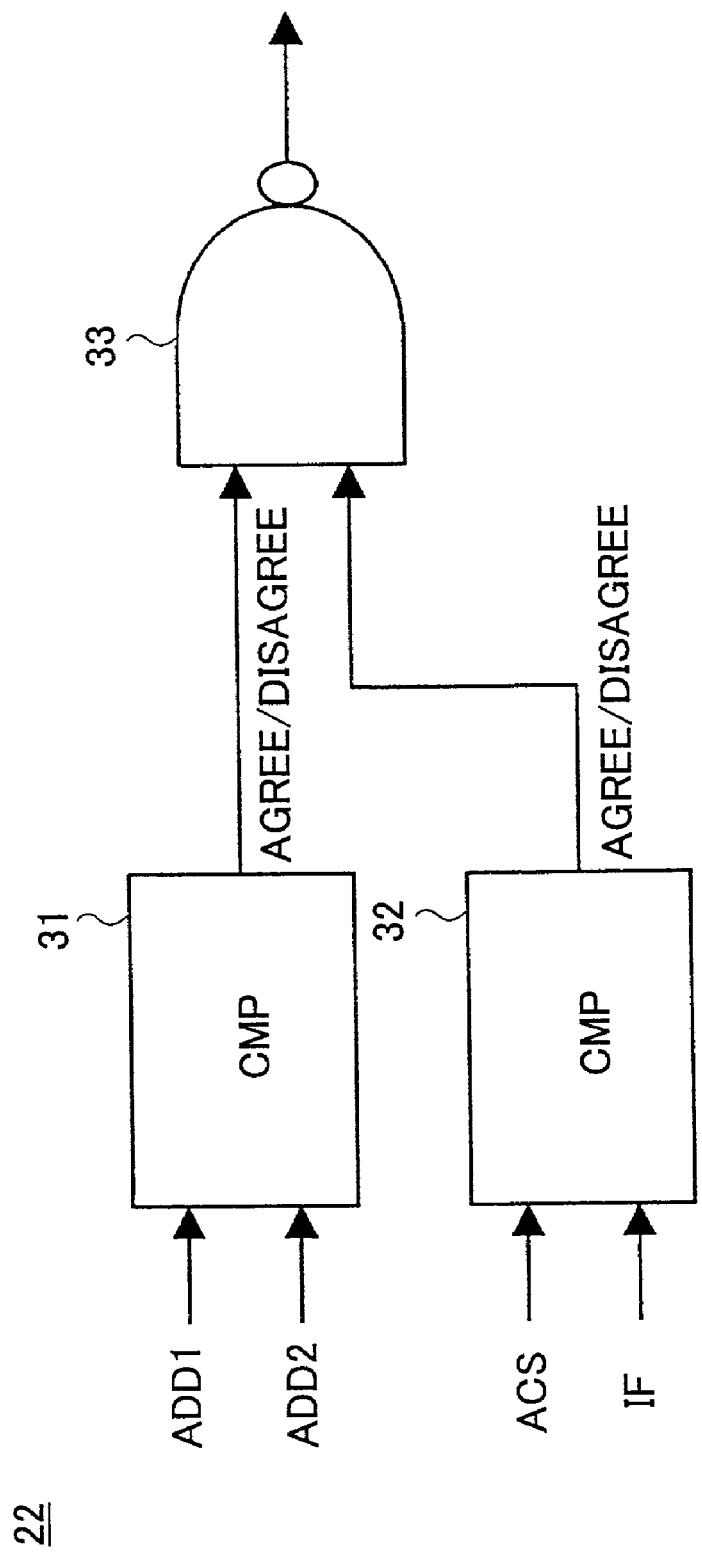
FIG. 6 is a block diagram of an access detector of the embodiment according to the present invention.

FIG. 6 is a block diagram of the access detector 22 of the embodiment according to the present invention.

Referring to FIG. 6, the access detector 22 includes comparators 31 and 32 and a NOT-AND (NAND) gate 33.

A first address ADD1 and a second address ADD2 are supplied from the CPU 21 to the comparator 31. The first address ADD1 is an address for data to access next. The second address ADD2 is an address for data after the change of the level of an access right is implemented. When the first address ADD1 agrees with the second address ADD2, the comparator 31 outputs "1". When the first address ADD1 disagrees with the second address ADD2, the comparator 31 outputs "0".

An access control signal ACS and another access control signal indicating an instruction fetch IF are supplied from the CPU 21 to the comparator 32. When the ACS agrees with the IF, the comparator 32 outputs "1". When the ACS disagrees with the IF, the comparator 32 outputs "0".

Outputs of the comparators 31 and 32 are supplied to the NAND gate 33. The NAND gate 33 outputs NAND logic of the output of the comparators 31 and the output of the comparators 32. When both outputs of the comparators 31 and 32 are "1", the output of the NAND gate 33 is "0". When the output of at least either of the comparators 31 and 32 is "0", the output of the NAND gate 33 is "1".

Thus, the NAND gate 33 outputs "0", when the address to access next agrees with the address of the level change routine RA and the access control signal indicates the instruction fetch. It is possible to recognize whether an access to the address of the level change routine RA is implemented, based on the output of the NAND gate 33.

The output of the access detector 22 is supplied to the level holding part 23. When the output of the access detector 22 is "0", the access level L0 is set at the level holding part 23. That is, when the level change routine RA is implemented, the access level L0 is held at the level holding part 23.

The access level that is pre-set for every task program Pt1, Pt2, and Pt3 is held at the level holding part 23 by the level change routine RB. The access level held at the level holding part 23 is supplied to the access control part 24.

The access control part 24 implements an access control to an address of the access requirement of the CPU 21, based on the access level held at the level holding part 23.

Here, the access control part 24 will be described with reference to FIG. 7.

Figure 7:
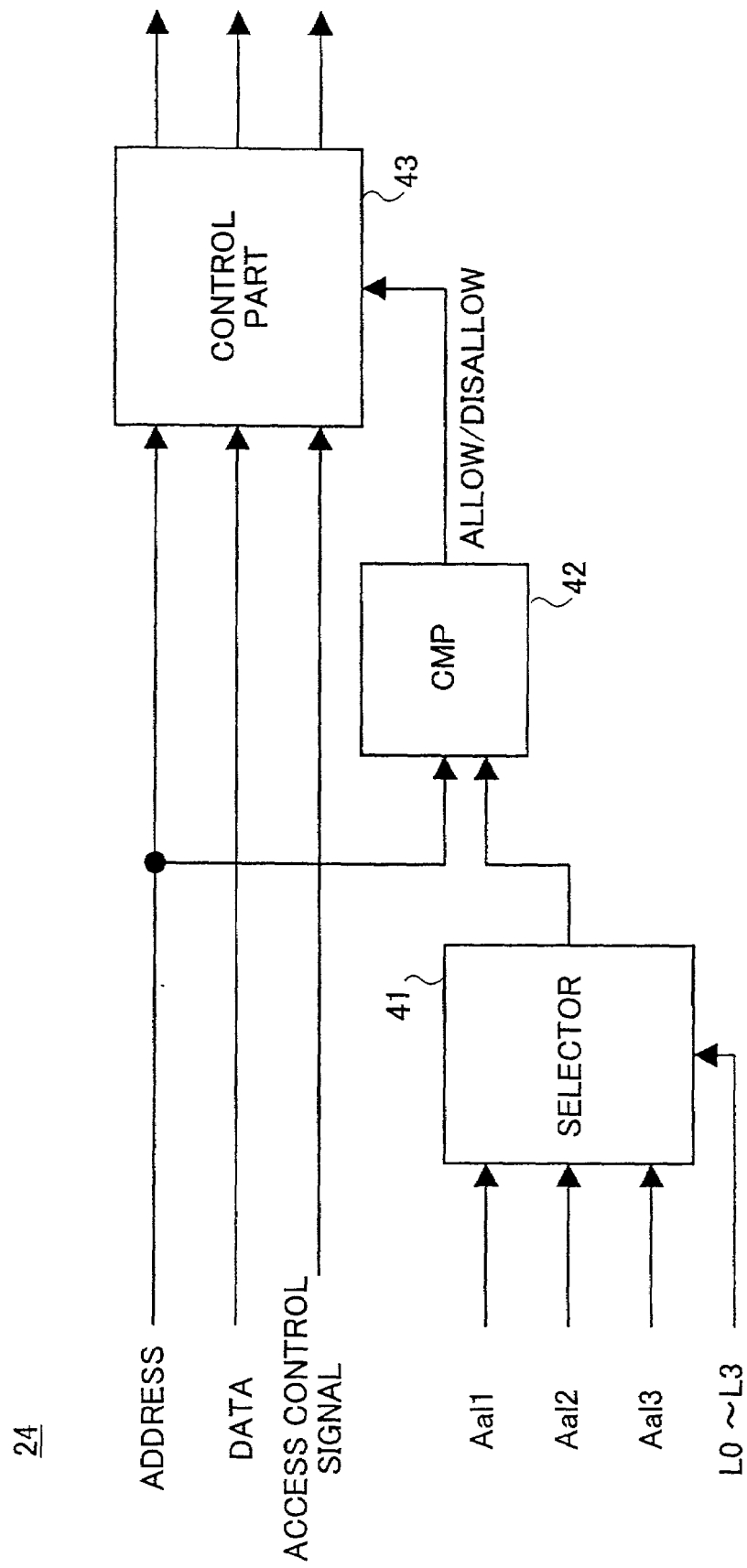
FIG. 7 is a block diagram of an access control part of the embodiment according to the present invention.

FIG. 7 is a block diagram of the access control part 24 of the embodiment according to the present invention.

Referring to FIG. 7, the access control part 24 includes a selector 41, a comparator 42, and a control part 43.

A first access allowance address Aal1 through a third access allowance address Aal3 are supplied from the access allowance setting part 25 to the selector 41. In addition, the access levels L0 through L3 held at the level holding part 23 are supplied to the selector 41.

Here, the access allowance setting part 25 will be described with reference to FIG. 8.

Figure 8:
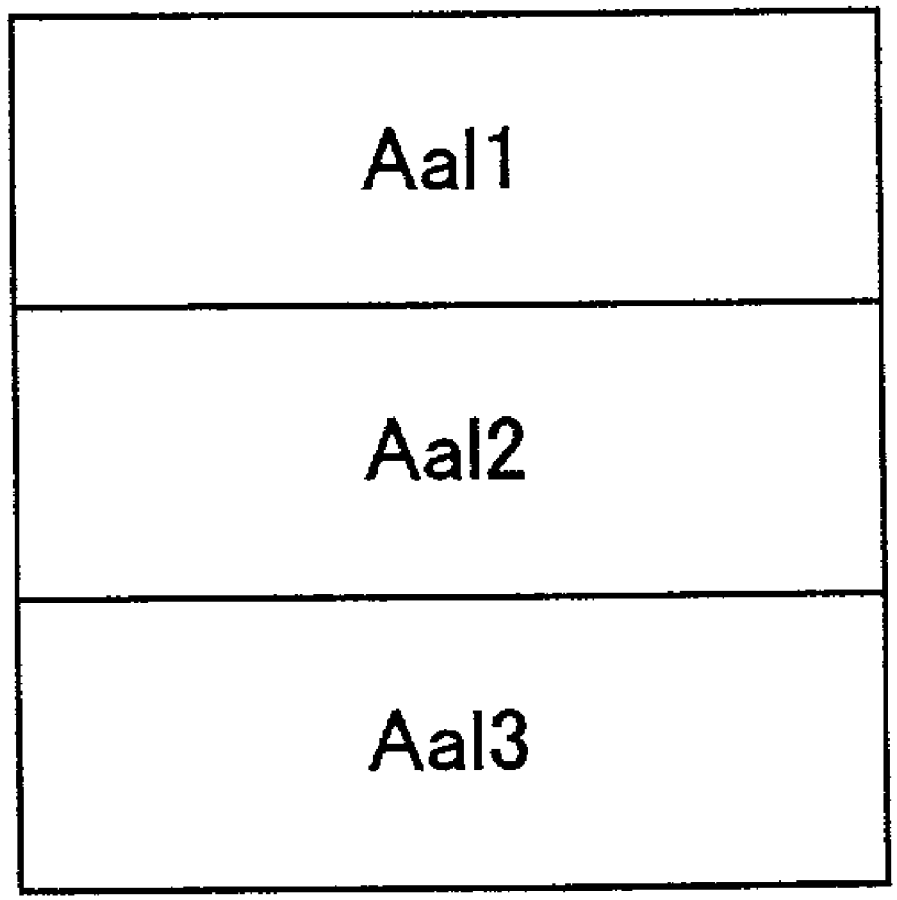
FIG. 8 is a block diagram of an access allowance setting part of the embodiment according to the present invention.

FIG. 8 is a block diagram of the access allowance setting part 25 of the embodiment according to the present invention.

Referring to FIG. 8, the first access allowance address Aal1 through the third access allowance address Aal3 are stored at the access allowance setting part 25, containing access levels L1 through L3 respectively.

Referring back to FIG. 7, an access allowance address corresponding to an access level held at the level holding part 23 is selected and supplied to the comparator 42 by the selector 41. For example, if the access level L1 is held at the level holding part 23, the first access allowance address Aal1 is selected from the first access allowance address Aal1 through the third access allowance address Aal3 supplied from the access allowance setting part 25, and supplied to the comparator 42 by the selector 41. Furthermore, if the access level L2 is held at the level holding part 23, the second access allowance address Aal2 is selected from the first access allowance address Aal1 through the third access allowance address Aal3 supplied from the access allowance setting part 25, and supplied to the comparator 42 by the selector 41. In addition, if the access level L3 is held at the level holding part 23, the third access allowance address Aal3 is selected from the first access allowance address Aal1 through the third access allowance address Aal3 supplied from the access allowance setting part 25, and supplied to the comparator 42 by the selector 41.

The comparator 42 compares an address supplied from the CPU 21 and the address supplied from the selector 41. When the address supplied from the CPU 21 agrees with the address supplied from the selector 41, the comparator 42 outputs "0" indicating allowance. When the address supplied from the CPU 21 disagrees with the address supplied from the selector 41, the comparator 42 outputs "1" indicating disallowance. The output of the comparator 42 is supplied to the control part 43.

An address line, a data line, and an access control line of the CPU 21 are connected with one end of the control part 43. The other address line, the other data line, and the other access control line, which are on a bus side and are connected with the external ROM 12, the RAM 13, the interface part 14, the level holding part 23, the access allowance setting part 25, and the internal ROM 26, are connected with the other end of the control part 43. The control part 43 controls the exchange of data and signals between the address line, the data line, and the access control line of the CPU 21 and the address line, the data line, and the access control line of the bus side, based on the outputs of the comparator 42.

For example, when "0" indicating allowance is supplied from the comparator 42 to the control part 43, it is possible to control to exchange the data and signals between the address line, the data line, and the access control line of the CPU 21 and the address line, the data line, and the access control line of the bus side, based on the outputs of the comparator 42. In addition, for example, when "1" indicating disallowance is supplied from the comparator 42 to the control part 43, it is impossible to control to exchange the data and signals between the address line, the data line, and the access control line of the CPU 21 and the address line, the data line, and the access control line of the bus side, based on the outputs of the comparator 42.

When the access level L0 is held at the level holding part 23, the selector 41 outputs an address causing the comparator 42 to output "0" indicating allowance in a case where any address is supplied from the CPU 21 to the selector 41.

As described above, the control part 43 controls to exchange the address, the data, and the access control signal between the side of the CPU 21 and the bus side. As a result, it is possible to control the access from the CPU 21 to the external ROM 12, the RAM 13, the interface part 14, the level holding part 23, the access allowance setting part 25, and the internal ROM 26. For example, when the access level L1 is held at the level holding part 23, it is possible to access an address corresponding to the first access allowance address Aal1. That is, it is possible to access only the first task program Pt1 and the first task data Dt1 but impossible to access the second task program Pt2, the second task data Dt2, the third task program Pt3, and the third task data Dt3. In addition, when the access level L2 is held at the level holding part 23, it is possible to access an address corresponding to the second access allowance address Aal2. That is, it is possible to access only the second task program Pt2 and the second task data Dt2 but impossible to access the first task program Pt1, the first task data Dt1, the third task program Pt3, and the third task data Dt3. Furthermore, when the access level L3 is held at the level holding part 23, it is possible to access an address corresponding to the third access allowance address Aal3. That is, it is possible to access only the third task program Pt3 and the third task data Dt3 but impossible to access the first task program Pt1, the first task data Dt1, the second task program Pt2, and the second task data Dt2.

Next a process of the CPU 21 will be described with reference to FIG. 9.

Figure 9:
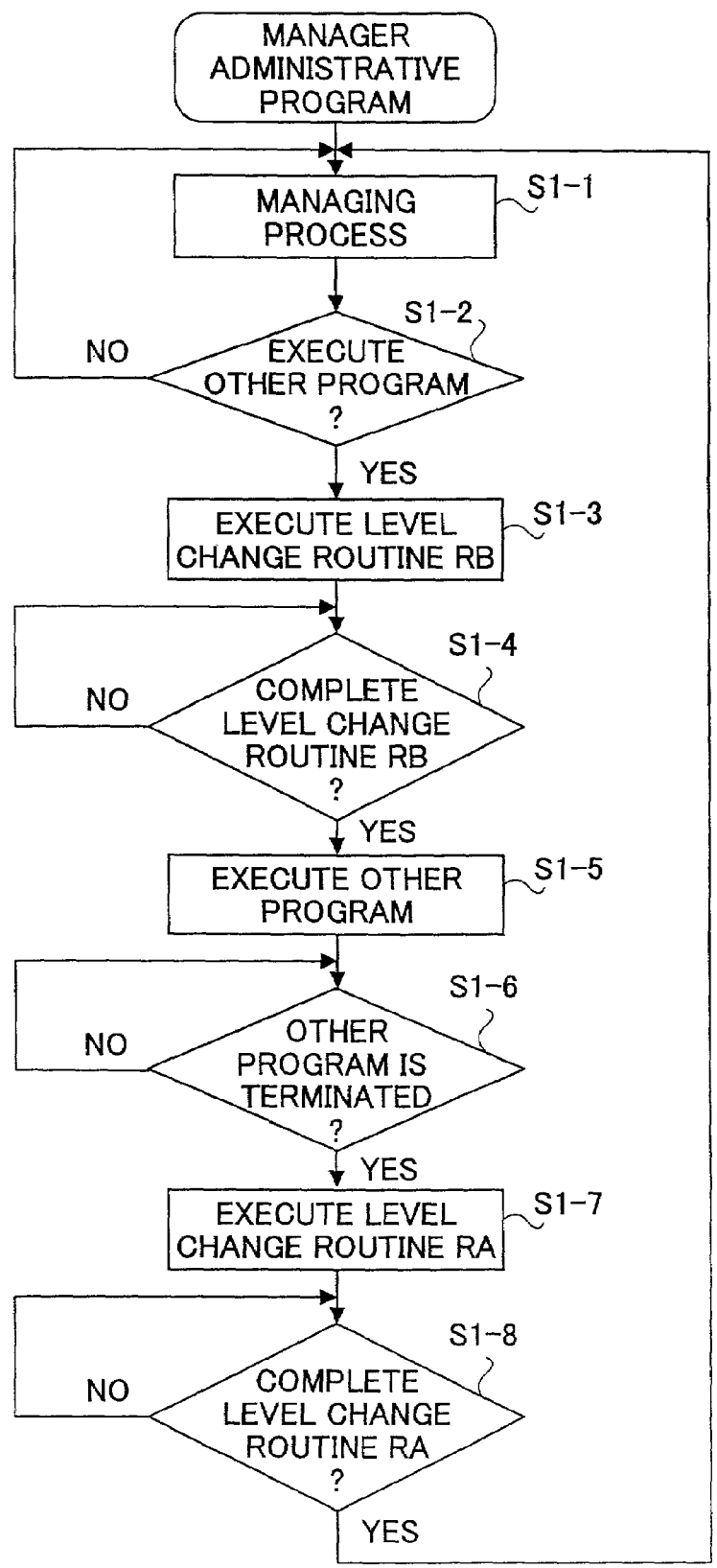
FIG. 9 is a flow chart of a process of a manager administrative program of the embodiment according to the present invention.

FIG. 9 is a flow chart of a process of the manager administrative program of the embodiment according to the present invention.

In step S1-1, the CPU 21 implements a managing process for managing an execution of the program. Since the managing process is implemented for all controlling, the access level L0 is set as an access level of the managing process so that it is possible to access all devices.

In step S1-2, it is determined whether or not another program such as the first task program Pt1 is required to be executed. If it is determined that another program is required to be executed in step S1-2, the level change routine RB is executed in step S1-3.

The level change routine RB is a process for changing the access level from the upper access level to the lower access level. That is, the level change routine RB is a process for changing the access level L0 set by the managing process to the access level L1 pre-set in the first task program Pt1.

Figure 10:
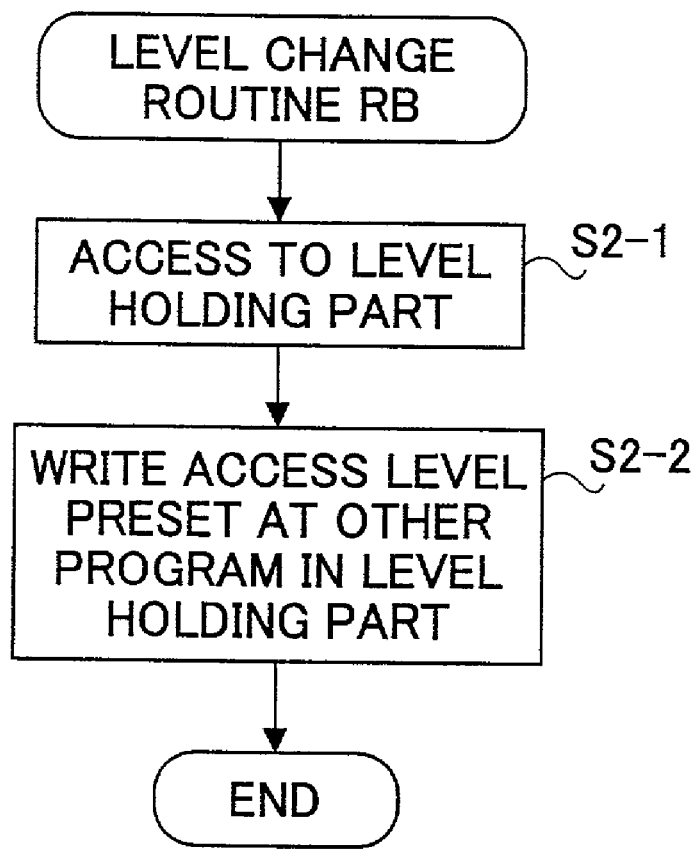
FIG. 10 is a flow chart of a process of a level change routine of the embodiment according to the present invention.

FIG. 10 is a flow chart of a process of the level change routine of the embodiment according to the present invention.

The CPU 21 accesses the level holding part 23 in step S2-1. In step S2-2, the access level which is pre-set at another program is written in the level holding part 23. In a case of the first task program Pt1, the access level L1 is held at the level holding part 23.

Referring back to FIG. 9, after the level change routine RB is determined to be completed in step S1-4, namely after the access level is changed from the level L0 to the level L1, the other program that is the first task program Pt1 is executed in step S1-5. The first task program Pt1 can access the device when the access level is L1. That is, the first task program Pt1 can access the level change routines RA and RB of the internal ROM 26, the first task program Pt1 and the data D of the external ROM 12, and the first task data Dt1 and the work area W of the RAM 13.

After the other program is terminated in step S1-6, the level change routine RA is executed in step S1-7. The level change routine RA is a process for changing the access level from the lower access level to the upper access level. That is, the level change routine RA is a process for changing the access level of the other program to the access level L0 of the manager administrative program.

Figure 11:
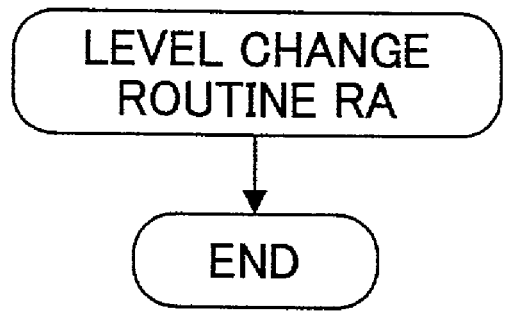
FIG. 11 is a flow chart of a process of a level change routine of the embodiment according to the present invention.

FIG. 11 is a flow chart of a process of a level change routine of the embodiment according to the present invention.

After the level change routine RA is executed, the CPU 21 supplies the address of the level change routine to the comparator 31. In addition, the CPU 21 supplies an access control signal indicating the instruction fetch to the comparator 32.

When the access control signal indicates the instruction fetch, the comparator 32 outputs "1".

When an address to access corresponds to the pre-set address of the level change routine RA, the comparator 31 outputs "1". When both of the comparators 31 and 32 output "1", the NAND gate 33 outputs "0", and thereby the access level held at the level holding part 23 becomes L0. When the access level held at the level holding part 23 is L0, the access to all of the devices is allowed by the access control part 24.

When the access to all of the devices can be allowed by the access control part 24, the level change routine RA is terminated in step S1-8. After the level change routine RA is terminated, the process goes back to the step S1-1 and the managing process is executed.

Thus, in this embodiment, when the first through third task programs Pt1 through Pt3 are executed, the manager administrative program and the level change routines RA and RB are also executed. As a result, the access level is changed. Accordingly, it is not possible to alter the access level and the manager administrative program. Furthermore, it is possible to prevent an illegal code from invading the manager administrative program.

In addition, in this embodiment, it is necessary to change the access level to the access level L0 being the privileged level by a specific routine namely the level change routine. Hence, it is not possible to execute the task in other levels. Since it is guaranteed that the levels other than a level in which the task is provided are not used, it is guaranteed that the data in an area other than the access allowance area are not destroyed and do not leak out. As a result, it is possible to realize a high security level of the information processing apparatus.

The present invention is not limited to these embodiments, but variations and modifications may be made without departing from the scope of the present invention.

This patent application is based on Japanese priority patent application No. 2001-145176 filed on May 15, 2001, the entire contents of which are hereby incorporated by reference.

What is claimed is:

1. An information processing apparatus, comprising:
a process part implementing an access to an address to be accessed having an access level;
an access detector detecting whether the address accessed by the process part agrees or disagrees with an address whose access level is changed, said access detector including a gate adapted to receive output based on said detecting and based on whether an access control signal indicates an instruction fetch; and
an access part receiving an output from the access detector and being capable of changing the access level registered at the access part when the access is detected by the access detector, said access level determining an area where access from a device to a source is allowed, said access part including:
a level holding part outputting an access level which is pre-set at the address registered at the access part when the access to the address to be accessed is detected by the access detector,
an access allowance setting part in which an access allowance address for every access level is set, and
an access control part selecting the access allowance address which is set at the access allowance setting part and which corresponds to the access level output from the level holding part, and thereby the access by the process part is allowed when the designated address accessed by the process part agrees with the access allowance address.

2. The information processing apparatus as claimed in claim 1, wherein the access detector comprises:
a first comparator detecting whether the address accessed by the process part agrees or disagrees with an address of a level change routine,
a second comparator detecting whether or not an access control signal output from the process part indicates an instruction fetch, and
a determination part determining that the first comparator detects the address accessed by the process part agrees with the address of a level change routine and the second comparator defects the access control signal indicating the instruction fetch.

3. The information processing apparatus as claimed in claim 1, wherein the access level registered at the access part is controlled to change from a first level where an access to a limited address is allowed to a second level where an access to all addresses is allowed.

4. The information processing apparatus as claimed in claim 1, wherein the access control part comprises:
   a select part selecting the access allowance address corresponding to the access level, a comparison part comparing the access allowance address selected by the select part and the address to be accessed, and
   a control part allowing the process part to access the address to be accessed when the address to be accessed agrees with the access allowance address.

5. The information processing apparatus as claimed in claim 1, the apparatus being further adapted for changing the access level registered at the access part from a second level where an access to all addresses is allowed to a first level where an access to a limited address is allowed, and the access level set at the level holding part is changed to the first level.

6. A method of controlling an access level of an address accessed by a process part of an information processing apparatus, comprising:
   a) detecting whether the address accessed by the process part agrees or disagrees with an address whose access level is changed and receiving output based on said detecting and based on whether an access control signal indicates an instruction fetch;
   b) supplying an output of the access detector to an access part, said access part:
      outputting an access level which is pre-set at a registered address when the access to the address to be accessed is detected,
      setting an access allowance address for every access level, and
      selecting the access allowance address which corresponds to an access level output, and thereby the access is allowed when the designated address agrees with the access allowance address; and
   c) changing the access level registered at the access part when the access is detected, said access level determining an area where an access from a device to a source is allowed.

7. The method of controlling the access level of the designated address accessed by the process part of the information processing apparatus, as claimed in claim 6, wherein the access level of the address to be accessed is changed when an instruction fetch is detected.

8. The method of controlling the access level of the designated address accessed by the process part of the information processing apparatus, as claimed in claim 6, wherein the access level registered at the access part is changed when the address accessed by the process part agrees with an address of a level change routine.

9. The method of controlling the access level of the designated address accessed by the process part of the information processing apparatus, as claimed in claim 6, wherein the access to the address to be accessed can be implemented when the address to be accessed agrees with a pre-set access allowance address.

10. The method of controlling the access level of the address accessed by a process part of the information processing apparatus, as claimed in claim 6, wherein the access level registered at the access part is limited to change from a first level where an access to a limited address is allowed to a second level where an access to all addresses is allowed.

11. The method of controlling the access level of the address accessed by the process part of the information processing apparatus, as claimed in claim 6, wherein the access level registered at the access part is changed from a second level where an access to all addresses is allowed to a first level where an access to a limited address is allowed.

12. An information processing apparatus, comprising:
    processor means for producing an access to an address to be accessed having a multiple level access level;
    access detector means for detecting whether the address accessed by the process part agrees or disagrees with an address whose access level is changed, said access detector means including a gate adapted to receive output based on said detecting and based on whether an access control signal indicates an instruction fetch; and
    access holder means for receiving an output from the access detector and being capable of changing the access level when the access is detected by the access detector, said access level determining an area where an access from a device to a source is allowed, said access holder means including:
       a level holding means outputting an access level which is pre-set at the address registered at the access part when the access to the address to be accessed is detected by the access detector,
       an access allowance setting means in which an access allowance address for every access level is set, and
       an access control means selecting the access allowance address which is set at the access allowance setting part and which corresponds to the access level output from the level holding part, and thereby the access by the process part is allowed when the designated address accessed by the process part agrees with the access allowance address.

13. An information processing apparatus, comprising:
    a process part implementing an access to an address to be accessed having an access level;
    an access detector detecting whether the address accessed by the process part agrees or disagrees with an address whose access level is changed, said access detector including a gate adapted to receive output based on said detecting and based on whether an access control signal indicates an instruction fetch;
    an access part receiving an output from the access detector and being capable of changing the access level registered at the access part when the access is detected by the access detector, said access level determining an area where access from a device to a source is allowed;
    wherein the access detector comprises:
       a first comparator detecting whether the address accessed by the process part agrees or disagrees with an address of a level change routine,
       a second comparator detecting whether or not an access control signal output from the process part indicates an instruction fetch, and
       a determination part determining that the first comparator detects the address accessed by the process part agrees with the address of a level change routine and the second comparator detects the access control signal indicating the instruction fetch.

14. A method of controlling an access level of an address accessed by a process part of an information processing apparatus, comprising:

detecting whether the address accessed by the process part agrees or disagrees with an address whose access level is changed and receiving output based on said detecting and based on whether an access control signal indicates an instruction fetch;

supplying an output of the access detector to an access part; and changing the access level registered at The access part when the access is detected, said access level determining an area where an access from a device to a source is allowed;

wherein the access level registered at the access part is changed when the address accessed by the process part agrees with an address of a level change routine.

\* \* \* \* \*

UNITED STATES PATENT AND TRADEMARK OFFICE
CERTIFICATE OF CORRECTION

| | |
|---|---|
| PATENT NO. | : 7,107,377 B2 |
| APPLICATION NO. | : 10/095091 |
| DATED | : September 12, 2006 |
| INVENTOR(S) | : Shimpei Komatsu et al. |

It is certified that error appears in the above-identified patent and that said Letters Patent is hereby corrected as shown below:

Title Page, Item (56) Column 2 (Other Publications), Line 4, change "1986." to --1986,--.

Column 9, Line 2, change "defects" to --detects--.

Column 12, Line 1, after "at" change "The" to --the--.

Signed and Sealed this

Third Day of April, 2007

JON W. DUDAS
*Director of the United States Patent and Trademark Office*